United States Patent
Sundaresan et al.

(10) Patent No.: US 6,516,683 B2
(45) Date of Patent: Feb. 11, 2003

(54) ELECTRIC ADJUSTABLE PEDAL SYSTEM WITH MECHANICAL ACTIVE LOCK-UP

(75) Inventors: Srini Sundaresan, Rochester Hills, MI (US); Gordon Lloyd Smith, Orion, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/751,006

(22) Filed: Dec. 29, 2000

(65) Prior Publication Data

US 2002/0083789 A1 Jul. 4, 2002

(51) Int. Cl.[7] .................................................. G05G 1/14
(52) U.S. Cl. ........................................................ 74/560
(58) Field of Search .................................... 74/512, 560

(56) References Cited

U.S. PATENT DOCUMENTS

| | | |
|---|---|---|
| 3,319,487 A | 5/1967 | Lystad et al. |
| 3,511,109 A | 5/1970 | Tanaka |
| 3,643,524 A | 2/1972 | Herring |
| 3,643,525 A | 2/1972 | Gibas |
| 3,646,831 A * | 3/1972 | Janosi .......................... 74/518 |
| 3,975,972 A | 8/1976 | Muhleck |
| 4,372,178 A * | 2/1983 | Ota .............................. 74/512 |
| 4,497,399 A | 2/1985 | Kopich |
| 4,683,977 A | 8/1987 | Salmon |
| 4,779,481 A | 10/1988 | Natzke et al. |
| 4,870,871 A | 10/1989 | Ivan |
| 4,875,385 A | 10/1989 | Sitrin |
| 4,989,474 A | 2/1991 | Cicotte et al. |
| 5,010,782 A | 4/1991 | Asano et al. |
| 5,078,024 A | 1/1992 | Cicotte et al. |
| 5,086,663 A | 2/1992 | Asano et al. |
| 5,351,573 A * | 10/1994 | Cicotte ......................... 74/512 |
| 5,460,061 A | 10/1995 | Redding et al. |
| 5,632,183 A | 5/1997 | Rixon et al. |
| 5,697,260 A * | 12/1997 | Rixon et al. .................... 74/514 |
| 5,722,302 A | 3/1998 | Rixon et al. |
| 5,771,752 A | 6/1998 | Cicotte |
| 5,819,593 A | 10/1998 | Rixon et al. |
| 5,823,064 A | 10/1998 | Cicotte |
| 5,832,784 A * | 11/1998 | McCallips et al. ............. 74/512 |
| 5,855,143 A | 1/1999 | Ewing |
| 5,884,532 A | 3/1999 | Rixon et al. |
| 5,890,399 A | 4/1999 | Rixon et al. |

(List continued on next page.)

FOREIGN PATENT DOCUMENTS

| | | | | |
|---|---|---|---|---|
| EP | 0 608 155 A1 | * | 7/1994 | ............. B06T/7/06 |
| JP | 2-302810 | * | 12/1990 | ............. G05G/7/04 |

Primary Examiner—David A. Bucci
Assistant Examiner—Timothy McAnulty
(74) Attorney, Agent, or Firm—Casimir R. Kiczek (57) ABSTRACT

An adjustable pedal assembly for a motor vehicle an upper arm having a pivot axis and first and second generally planar members, and a lower arm having a lower end carrying a pedal and an upper end operatively connected to the upper arm for selected movement relative to the upper arm. The first and second members are generally parallel and spaced apart. The first and second members each form first and second camming surfaces at a peripheral edge thereof. The upper arm carries first and second cam pins laterally extending from the lower arm and engaging the first and second camming surfaces respectively. The first and second camming surfaces and the first and second cam pins are adapted to mechanically lock the upper and lower arms together for mutual rotation about the pivot axis upon application of a load to the pedal. Preferably a spring operably connects the upper and lower arms to resiliently bias the first and second cam pins into engagement with the first and second camming surfaces. A drive assembly is operatively connected to the lower arm to selectively move the lower arm relative to the upper arm so that the operator can selectively adjust the position.

23 Claims, 9 Drawing Sheets

U.S. PATENT DOCUMENTS

| | | |
|---|---|---|
| 5,901,614 A | 5/1999 | Ewing |
| 5,913,946 A | 6/1999 | Ewing |
| 5,927,154 A | 7/1999 | Elton et al. |
| 5,937,707 A | 8/1999 | Rixon et al. |
| 5,964,125 A | 10/1999 | Rixon et al. |
| 5,996,438 A | 12/1999 | Elton |
| 6,019,015 A | 2/2000 | Elton |
| 6,070,489 A | 6/2000 | Ananthasivan et al. |
| 6,109,241 A | 8/2000 | Engelgau |
| 6,134,492 A | 10/2000 | Breed et al. |
| 6,151,984 A | 11/2000 | Johansson et al. |
| 6,151,985 A | 11/2000 | Garber et al. |
| 6,151,986 A | 11/2000 | Willemsen et al. |
| 6,250,176 B1 * | 6/2001 | Reimann et al. ............... 74/512 |
| 6,301,993 B1 * | 10/2001 | Orr et al. ...................... 74/512 |

* cited by examiner

ELECTRIC ADJUSTABLE PEDAL SYSTEM WITH MECHANICAL ACTIVE LOCK-UP

FIELD OF THE INVENTION

The present invention generally relates to an improved control pedal for a motor vehicle and, more particularly, to a control pedal for a motor vehicle which is selectively adjustable to desired positions.

BACKGROUND OF THE INVENTION

Control pedals are typically provided in a motor vehicle, such as an automobile, which are foot operated by the driver. Separate control pedals are provided for operating brakes and an engine throttle. When the motor vehicle has a manual transmission, a third control pedal is provided for operating a transmission clutch. A front seat of the motor vehicle is typically mounted on tracks so that the seat is forwardly and rearwardly adjustable along the tracks to a plurality of positions so that the driver can adjust the front seat to the most advantageous position for working the control pedals.

This adjustment method of moving the front seat along the tracks generally fills the need to accommodate drivers of various size, but it raises several concerns. First, this adjustment method still may not accommodate all drivers due to very wide differences in anatomical dimensions of drivers. Second, the necessary position of the seat may be uncomfortable for some drivers. Therefore, it is desirable to have an additional or alternate adjustment method to accommodate drivers of various size.

Many proposals have been made to selectively adjust the position of the control pedals relative to the steering wheel and the front seat in addition to adjusting the front seat in order to accommodate drivers of various size. These adjustable control pedals can actuate either a cable which is connected to an engine throttle, for example, or an electronic throttle control (ETC) where an electric signal is sent to the engine throttle which is proportional to the positioning of the pedal. Such "drive-by-wire" ETC pedals were adapted from fly-by-wire" aircraft pedals, and the ETC can be, for example, either a dual slope potentiometer where the electric signal is proportional to rotation of the pedal, or a linear variable displacement transducer (LVDT) where the electric signal is proportional to linear displacement of the pedal or a carrier operatively connected to the pedal. See, for example, U.S. Pat. No. 5,056,742 to Sakurai showing adjustable pedals which control brakes and rudders of a motor vehicle such as an aircraft. A mounting frame or carrier is mounted in a base frame or support structure so that the carrier can be adjusted forward or rearward by operation of a screw device or drive assembly. Pedals are pivotally connected directly to the multi-part carrier for pivotal movement relative to the carrier and are moved to various adjusted positions with the forward/rearward movement of the carrier relative to the support structure. Transducers or generator means are mounted on the carrier and move with the carrier to the various adjusted positions. These transducers have outputs responsive to the pivotal movement of the pedals relative to the carrier which vary in magnitude in proportion to the extent of movement of the pedals relative to the carrier. It is readily apparent to those skilled in the art of adjustable control pedals that the pedals connected to the carrier can have many different forms depending on the requirements of the particular motor vehicle such as, for example, in automobiles the pedal is typically in the form of a pedal arm extending from a pivot connection to a lower end having a pad.

U.S. Pat. Nos. 5,632,183, 5,697,260, 5,722,302, 5,819,593, 5,937,707, and 5,964,125, the disclosures of which are expressly incorporated herein in their entirety by reference, each disclose an example of an adjustable control pedal assembly. This control pedal assembly includes a hollow guide tube, a rotatable screw shaft coaxially extending within the guide tube, a nut in threaded engagement with the screw shaft and slidable within the guide tube, and a control pedal rigidly connected to the nut. The control pedal is moved forward and rearward when an electric motor rotates the screw shaft to translate the nut along the screw shaft within the guide tube. While this control pedal assembly may adequately adjust the position of the control pedal to accommodate drivers of various size, this control pedal assembly is relatively complex and expensive to produce. The relatively high cost is particularly due to the quantity of high-precision machined parts such as, for example, the guide tube and due to the quantity of welded joints.

U.S. Pat. Nos. 3,643,525 and 3,643,524, the disclosures of which are expressly incorporated herein in their entirety by reference, each disclose an example of an adjustable control pedal assembly which is much less expensive to produce. This control pedal assembly includes an upper arm having a single horizontal slot, a rotatable screw shaft attached to the upper arm and extending along the slot, a nut in threaded engagement with the screw shaft and having a pin slidable within the slot, and a control pedal rigidly connected to the nut. The control pedal is moved forward and rearward when an electric motor rotates the screw shaft to translate the nut along the screw shaft. While this control pedal assembly may adequately adjust the position of the control pedal to accommodate drivers of various size and is relatively inexpensive to produce, this control pedal is relatively unstable and can have a relatively large amount of lash. That is, components of the control pedal are subject to vibration during regular operation of the motor vehicle causing the components to rub or strike together causing undesirable noise.

While these adjustable pedal systems may adequately adjust the position of control pedals, these systems may not properly operate when a drive component fails because loads to pivot the control pedals are transferred through the drive assembly. That is, the systems have a single point failure mode. Accordingly, there is a need in the art for an adjustable pedal assembly which selectively adjusts the position of the control pedal to accommodate drivers of various size, is relatively simple and inexpensive to produce, and is mechanically locked for operation when a load is applied to the control pedal even upon failure of drive components.

SUMMARY OF THE INVENTION

The present invention provides an adjustable pedal assembly for a motor vehicle which overcomes at least some of the above-noted problems of the related art. According to the present invention, an adjustable pedal assembly includes, in combination, an upper arm having a pivot axis, a lower arm having a lower end carrying a pedal and an upper end operatively connected to the upper arm for selected movement relative to the upper arm, and a drive assembly operatively connected to the lower arm to selectively move the lower arm relative to the upper arm. One of the upper arm and the lower arm forms first and second camming surfaces and the other of the upper arm and the lower arm carries first and second cam followers engaging the first and second camming surfaces respectively. The first and second camming surfaces and the first and second cam followers are adapted to lock the upper and lower arms together for mutual rotation about the pivot axis upon application of a load to the pedal.

According to another aspect of the present invention, an adjustable pedal assembly comprises, in combination, an upper arm having a pivot axis and a generally planar member forming first and second camming surfaces at a peripheral edge thereof, and a lower arm having a lower end carrying a pedal and an upper end operatively connected to the upper arm for selected movement relative to the upper arm. The upper arm carries first and second cam pins laterally extending from the lower arm and engaging the first and second camming surfaces respectively. The first and second camming surfaces and the first and second cam pins are adapted to lock the upper and lower arms together for mutual rotation about the pivot axis upon application of a load to the pedal. A drive assembly is operatively connected to the lower arm to selectively move the lower arm relative to the upper arm.

According to yet another aspect of the present invention, an adjustable pedal assembly comprises, in combination, an upper arm having a pivot axis and first and second generally planar members, and a lower arm having a lower end carrying a pedal and an upper end operatively connected to the upper arm for selected movement relative to the upper arm. The first and second members are generally parallel and spaced apart. The first and second members each form first and second camming surfaces at a peripheral edge thereof. The upper arm carries first and second cam pins laterally extending from the lower arm and engaging the first and second camming surfaces respectively. The first and second camming surfaces and the first and second cam pins are adapted to lock the upper and lower arms together for mutual rotation about the pivot axis upon application of a load to the pedal. A drive assembly is operatively connected to the lower arm to selectively move the lower arm relative to the upper arm.

From the foregoing disclosure and the following more detailed description of various preferred embodiments it will be apparent to those skilled in the art that the present invention provides a significant advance in the technology and art of adjustable control pedal assemblies. Particularly significant in this regard is the potential the invention affords for providing a high quality, feature-rich, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

It should be understood that the appended drawings are not necessarily to scale, presenting a somewhat simplified representation of various preferred features illustrative of the basic principles of the invention. The specific design features of an adjustable control pedal as disclosed herein, including, for example, specific dimensions, orientations, locations, and shapes of the slots and the pins will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the adjustable pedal assembly illustrated in the drawings. In general, up or upward refers to an upward direction in the plane of the paper in FIGS. 1 to 9 and down or downward refers to a downward direction in the plane of the paper in FIGS. 1 to 9. Also in general, fore or forward refers to a direction toward the front of the motor vehicle, that is, to the left in the plane of the paper in FIGS. 1, 2, and 6–9 and aft or rearward refers to a direction toward the rear of the motor vehicle , that is, to the right in the plane of the paper in FIGS. 1, and 6–9.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved adjustable control pedal disclosed herein. The following detailed discussion of various alternative and preferred embodiments will illustrate the general principles of the invention with reference to an adjustable control pedal for use with a motor vehicle. Other embodiments suitable for other applications will be apparent to those skilled in the art given the benefit of this disclosure.

Referring now to the drawings, FIGS. 1 to 4 show an adjustable pedal assembly 10 for a motor vehicle, such as an automobile, according to a first embodiment of the present invention which is selectively adjustable to a desired forward/rearward position by a motor vehicle operator or driver. While the illustrated embodiments of the present invention are particularly adapted for use with an automobile, it is noted that the present invention can be utilized with any vehicle having at least one foot operated control pedal including trucks, buses, vans, recreational vehicles, earth moving equipment and the like, off road vehicles such as dune buggies and the like, air borne vehicles, and water borne vehicles.

The illustrated adjustable pedal assembly 10 is adapted as a brake pedal but it is noted that adjustable pedal assembly 10 can alternatively be adapted as a clutch, accelerator, or other desired pedal within the scope of the present invention.

While the illustrated adjustable pedal assembly 10 has a single adjustable control pedal, it is also noted that two control pedals can be utilized together within the scope of the present invention such as, for example, control pedals adapted as brake and accelerator pedals respectively. It is further noted more than two control pedals can be utilized together within the scope of the present invention such as, for example, three control pedals adapted as clutch, brake and accelerator pedals respectively. The adjustable pedal assembly 10 is selectively adjustable by the motor vehicle operator in a forward/rearward direction as described in more detail hereinafter. When more than one adjustable control pedal is utilized, the control pedals are preferably adjusted together simultaneously to maintain desired relationships between the control pedals such as, for example, "step over", that is, the forward position of the accelerator pedal relative to the brake pedal, and "pedal angles", that is, the orientation of the contact surfaces of the pedal pads. It is noted however, that individual adjustment of a single control pedal is within the scope of the present invention.

As best shown in FIGS. 1–4, the illustrated adjustable pedal assembly 10 includes an upper arm 12 having first and second plates or members 14, 16, a lower pedal arm 18 supported by the first and second members 14, 16 and carrying a pad or pedal 20 for engagement by the foot of the motor vehicle operator, and a drive assembly 22 for moving of the lower pedal arm 18 relative to the upper pedal arm 12 to adjust the position of the pedal 20. The upper pedal arm 12 is sized and shaped for pivotal attachment to a mounting bracket 24. The mounting bracket 24 is adapted to rigidly attach the adjustable pedal assembly 10 to a firewall or other rigid structure of the motor vehicle in a known manner. The upper pedal arm 12 is adapted for pivotal attachment to the mounting bracket 24. The illustrated first and second members 14, 16 of the upper pedal arm 12 each have an opening formed for cooperation with the mounting bracket 24 and an axle or pivot pin 26. With the pivot pin 26 extending through the mounting bracket 24 and the openings of the first and second members 14, 16, the upper pedal arm 12 is pivotable relative to the fixed mounting bracket 24 about a horizontally and laterally extending pivot axis 28 formed by the central axis of the pivot pin 26. A spacer can be provided about the pivot pin 26 between the first and second members 14, 16 to maintain a desired distance between the first and second members 14, 16.

The illustrated first and second members 14, 16 of the upper pedal arm 12 are substantially identical and are rigidly connected together to pivot together about the pivot pin 26 in unison. Each first and second member 14, 16 is an elongate plate oriented in a vertical plane. The first and second members 14, 16 are laterally spaced apart to form a space therebetween for receipt of the lower pedal arm 18. The first and second members 14, 16 are preferably formed of a suitable metal such as steel but can alternatively be formed of other suitable materials such as, for example, plastics like NYLON, aluminum, or magnesium. The illustrated first and second members 14, 16 are generally "L-shaped" having a generally vertical upper portion which generally extends downward from the pivot axis 28 and a generally horizontal lower portion which generally extends in a rearward direction from a lower end of the upper portion. The upper portion of the first and second members 14, 16 is adapted for pivotal attachment to the mounting bracket 24 as described hereinabove. The illustrated opening for receiving the pivot pin 26 is located near the top of the upper portion but the opening can have other suitable locations on the first and second members 14, 16 within the scope of the present invention.

The lower portion of the first and second members 14, 16 is adapted for supporting the lower pedal arm 18 and for selected fore and aft movement of the lower pedal arm 18 relative to the first and second members 14, 16 along the lower portion as described in more detail hereinafter. The illustrated lower portion has an elongate opening or slot 30 formed therein which generally extend in a forward/rearward direction along the length of the lower portion. The illustrated slot 30 is generally arcuate or curved. The lower portion is substantially planar or flat at least in the areas adjacent the slot and the slot 30 is open laterally through the entire thickness of the first and second members 14, 16. The slot 30 is sized and shaped for cooperation with the lower pedal arm 18 for substantially linear forward/rearward movement of the pedal 20 relative the upper pedal arm 12 over a desired adjustment range, such as about three inches, as described in more detail hereinbelow.

The upper pedal arm 12 is operatively connected to a control device such as a clutch, brake or throttle such that pivotal movement of the upper pedal arm 12 about the pivot axis 28 operates the control device in a desired manner. The upper pedal arm 12 can be connected to the control device by, for example, a push-pull or Bowden cable for mechanical actuation or by a sensor and electrical wire or cable for electronic actuation. The illustrated upper pedal arm 12 is provided with a booster pin 32 for connection to the control device by a mechanical actuator. The illustrated booster pin 32 extends through openings in each of the first and second members 14, 16 and secures the first and second members 14, 16 together. Alternatively, the booster pin 32 can extend through only one of the first and second members 14, 16 if other means for connecting the first and second members 14, 16 together is provided. A spacer can be provided to maintain a desired distance between the first and second members 14, 16. The illustrated booster pin 32 is rigidly secured by staking but other suitable connections can be utilized such as, for example, welding, spring clips, a snap-fit connection, or threaded connection. The illustrated booster pin 32 is located at the forward end of the first and second members 14, 16. Other suitable locations for the booster pin 32 can be utilized within the scope of the present invention.

A spacer pin 34 extends through openings in each of the first and second members 14, 16 and secures the first and second members 14, 16 together. The illustrated spacer pin 34 is rigidly secured by staking the end portions but other suitable connections can be alternatively utilized such as, for example, welding, spring clips, a snap-fit connection, or threaded connection. The illustrated spacer pin 34 is located at the rearward end of the first and second members 14, 16 and generally opposite the booster pin 32. Other suitable locations for the spacer pin 34 and additional spacer pins can be utilized within the scope of the present invention The illustrated upper pedal arm 12 is also provided with a switch pin 36 for connection to a switch for indicator lights such as brake lights such that the indicator lights indicate actuation, that is pivotal movement about the pivot axis 28, of the adjustable pedal assembly 10 by the operator. The illustrated switch pin 36 extends through an opening in the first or left member 14. The switch pin 36 is rigidly secured by staking but can alternatively be secured in any suitable manner such as, for example, welding, spring clips, a snap-fit connection, or a threaded connection such as a nut. Alternatively, the switch pin 36 can extend through both of the first and second members 14, 16 to additionally connect the first and second members 14, 16 together.

The first and second members 14, 16 each form first and second locking or camming surfaces 38, 40. The illustrated first camming surface 38 is formed by the top peripheral edge of the lower portion of the first and second members 14, 16. The illustrated second camming surface 40 is formed by the bottom peripheral edge of the lower portion of the first and second members 14, 16. It is noted that the camming surfaces 38, 40 can have other shapes and locations within the scope of the present invention as illustrated hereinafter. The camming surfaces 38, 40 are sized and shaped to mechanically lock the upper and lower pedal arms together when a load is applied to the adjustable pedal assembly by the operator as described in more detail hereinafter.

The lower pedal arm 18 is preferably formed of a suitable metal such as steel but one or both can alternatively be formed of other suitable materials such as, for example, plastics like NYLON, aluminum, or magnesium. The illustrated lower pedal arm 18 is formed of an elongate plate oriented in a vertical plane substantially parallel to planes of the first and second members 14, 16. The upper end of the lower pedal arm 18 is adapted for movement relative to the upper pedal arm 12 between first and second members 14, 16 and along the slots 30. The upper end of the lower pedal arm 18 is provided with a guide pin 42 laterally and horizontally extending therefrom to cooperate with the slots 30 of the first and second members 14, 16 to form two sliding pin-and-slot connections for linearly moving the lower pedal arm 18 relative to the upper pedal arm 12. The lower end of the lower pedal arm 18 is sized and shaped to carry the rearward-facing pedal 20. The pedal 20 is adapted for depression by the driver of the motor vehicle to pivot the adjustable pedal assembly 10 about the pivot axis 28 to obtain a desired control input to the motor vehicle through the movement of the booster pin 32.

Figure 1:
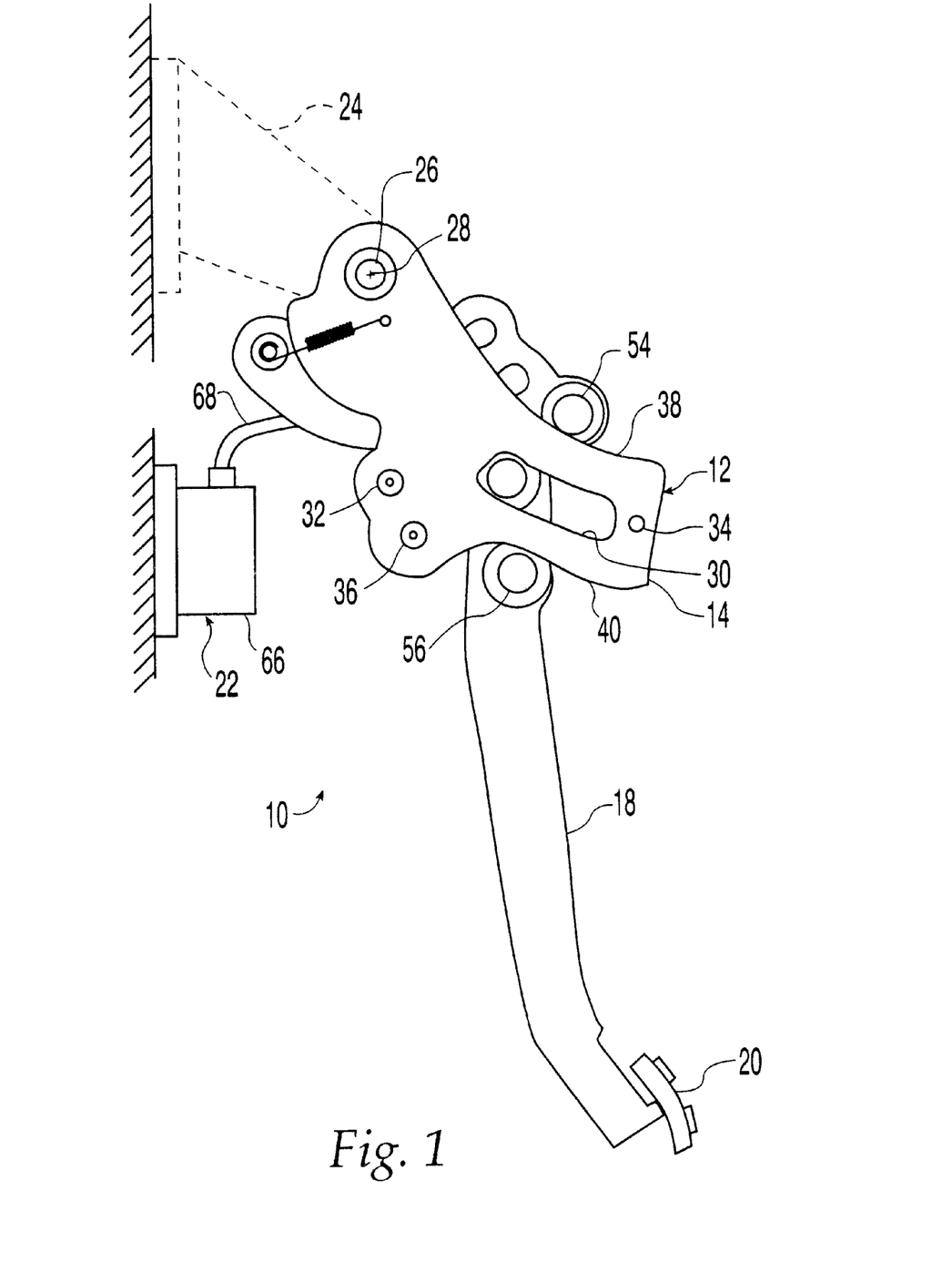
FIG. 1 is a left side elevational view of an adjustable pedal assembly according a first embodiment of the present invention.
Figure 2:
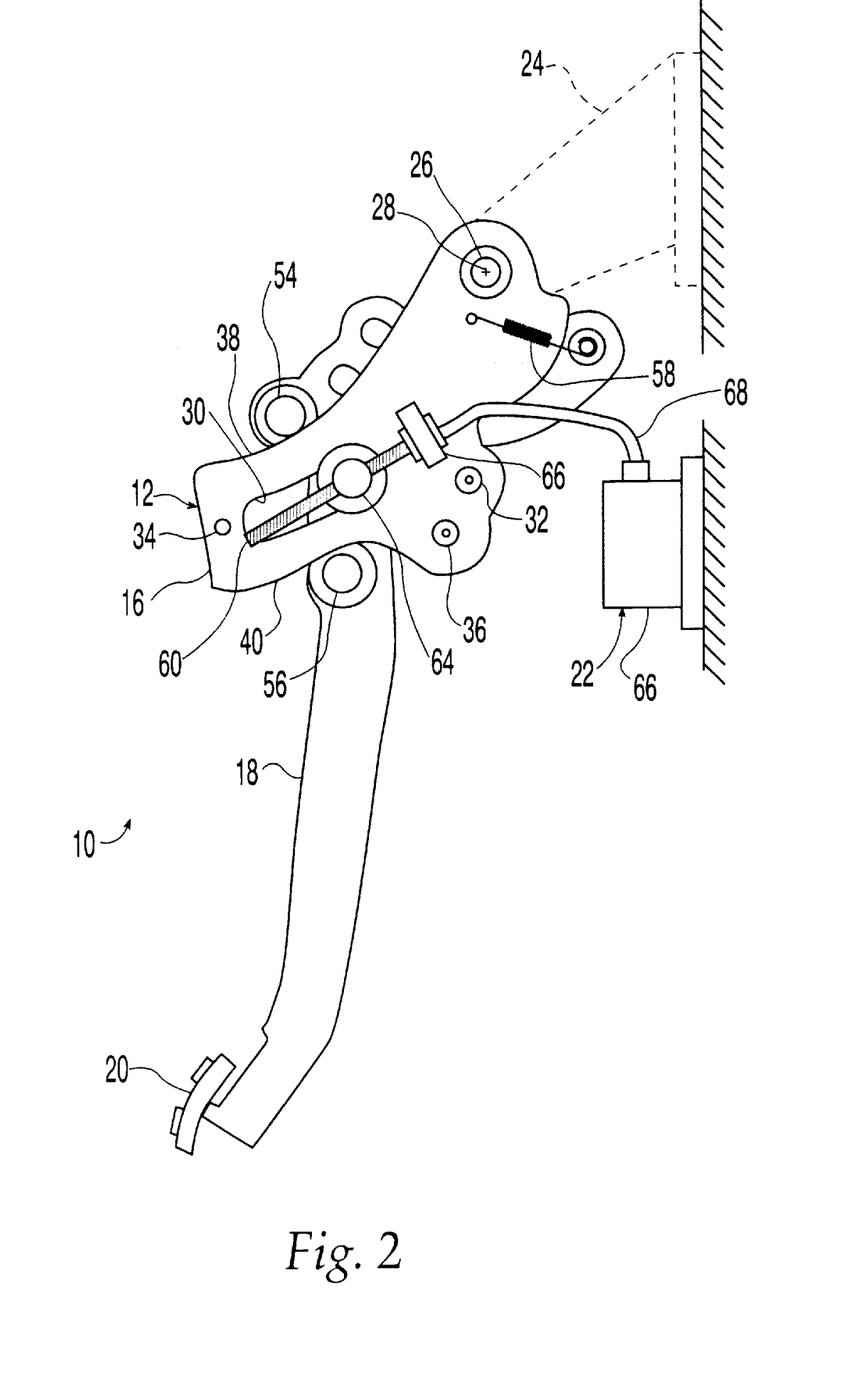
FIG. 2 is a right side elevational view of the adjustable pedal assembly of FIG. 1.
Figure 3:
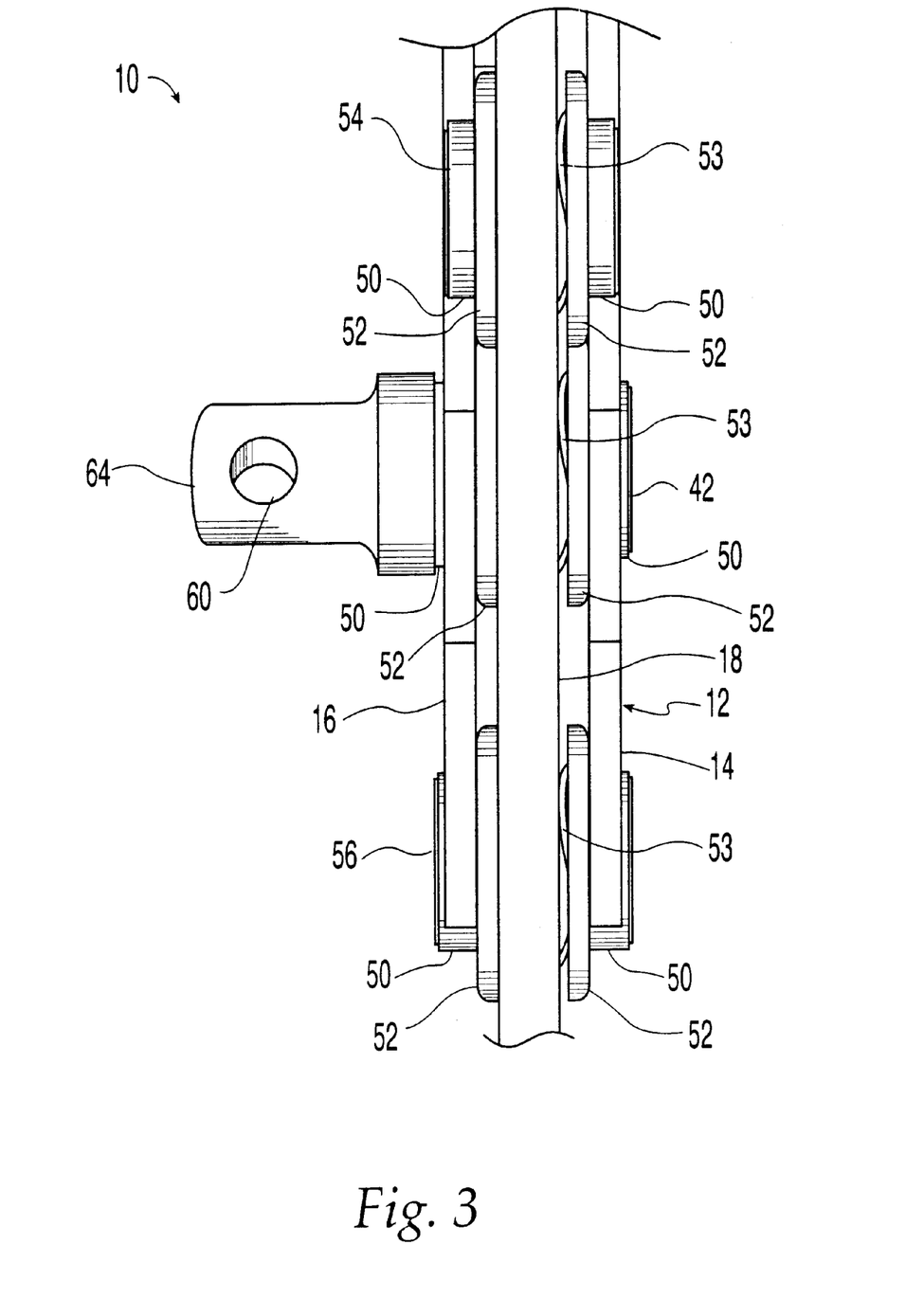
FIG. 3 is an fragmented, enlarged rear elevational view of a portion of the adjustable pedal assembly of FIGS. 1 and 2.
Figure 4:
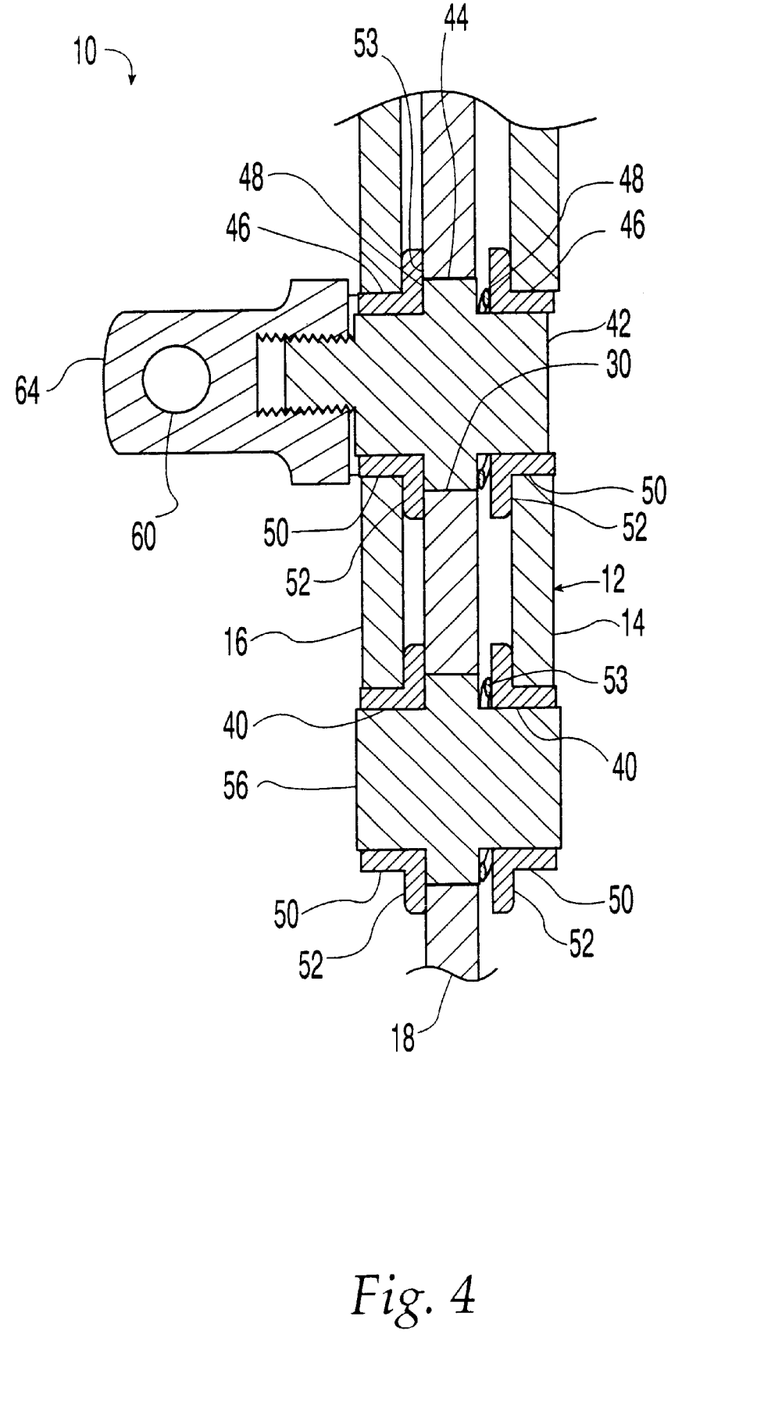
FIG. 4 is an enlarged cross-sectional view of a portion of the adjustable pedal assembly of FIGS. 1 to 3 taken along line 4—4 of FIG. 2.

As best shown in FIG. 4, the illustrated guide pin 42 has a central portion 44 sized for cooperating with an opening in the lower pedal arm 18 and opposed end portions 46 sized for cooperating with the slots 30 in the first and second members 14, 16 as described in more detail hereinafter. The central portion 44 is preferably sized to freely rotate relative to the lower pedal arm 18. It is noted, however, that in other embodiments the guide pin 42 can alternatively be rigidly secured to the lower pedal arm 18 and rotate within the slots 30. The guide pin 42 is preferably retained within the lower pedal arm 18 by engaging the first and second members 14, 16 as described in more detail hereinafter.

The end portions 46 are preferably sized smaller than the central portion 44 to form outward facing abutments 48. The abutments 48 enable the central portion 44 to act as a spacer to maintain the desired distance between the first and second members 14, 16. The end portions 46 are preferably provided with engagement surfaces sized and shaped to cooperate with bushings 50 which encircle the end portions 46 and extend within the slots 30. The bushings 50 are sized and shaped to closely conform with the end portions 46, particularly at the engagement surfaces. The end portions 46 and bushings 50 are sized and shaped so that there is very little or no vertical movement or "play" for the guide pin 42 within the slots 30. Flanges 52 of the bushings 50 are sized to extend between the lower pedal arm 18 and the first and second members 14, 16 and to engage the first and second members 14, 16 adjacent the slots 30. The flanges 52 are sized and shaped so that there is very little or no lateral movement or "play" for the lower pedal arm 18 between the first and second members 14, 16. The bushings 50 are preferably formed of a suitable plastic or polymer material but can alternatively be any other type of suitable wear resistant and/or low friction material such as a powder metal.

It is noted that the bushings 50 can alternatively be eliminated and snap-in plastic inserts utilized to cover engagement surfaces of the slots 30 so that the guide pin 42 engages the inserts within the slots. Suitable inserts are disclosed in U.S. patent application Ser. No. 09/492,238, the disclosure of which is expressly incorporated herein in its entirety by reference. It is also noted that the bushings 50 can alternatively be eliminated such that the guide pin 42 directly contact the slots 30. Preferably, a spring member 53 such as the illustrated wave washer is provided to further reduce lateral movement or play between the upper and lower pedal arms 12, 18. See U.S. patent application Ser. No. 09/564,355, the disclosure of which is expressly incorporated herein in its entirety by reference, for a more detailed disclosure of a suitable spring member 53.

The upper end of the lower pedal arm 18 is provided with first and second lock or cam followers or pins 54, 56 which cooperate with the first and second camming surfaces 38, 40 of the upper pedal arm 18 respectively. The first and second cam pins 54, 56 cooperate with the camming surfaces 38, 40 to actively lock the upper and lower pedal arms 12, 18 together when a load is applied by the operator to the pedal 20. That is, when a load is applied to the pedal, normal forces are applied through the camming pins 54, 56 to the camming surfaces resulting in a lock-up condition so that the upper and lower pedal arms 12, 18 are mechanically locked together to rotate in unison about the pivot axis 28. As best shown in FIG. 4, the illustrated cam pins 54, 56 are substantially the same as the guide pin 42 except that they engage a peripheral edge of the upper pedal arm 18 rather than an edge of a slot 30 formed in the upper pedal arm 18.

The illustrated embodiment includes a spring member 58 operatively connecting the upper and lower pedal arms 12, 18 to resiliently bias the cam pins 54, 56 into engagement with the camming surfaces 38, 40 so that there is very little or no movement or lateral play therebetween. The illustrated spring member 58 is a coiled tension spring but other suitable types of springs can be utilized within the scope of the present invention. The spring member 58 is preferably positioned to act on the center point so that it will always apply the same force.

The guide pin 42 extends through the slots 30 of the first and second members 14, 16 so that the lower pedal arm 18 is supported by the first and second members 14, 16 by contact of the guide pin 42 with bottom bearing surfaces of the slots 30 and the lower pedal arm 18 is movable fore and aft relative to the first and second members 14, 16 as the guide pin 42 slides along the bottom bearing surfaces of the slots 30. The guide pin 42 is in a double shear loading condition because the opposed end portions 46 are supported by the first and second members 14, 16 and the loads are applied to the central portion 44 by the lower pedal arm 18. It is noted that the guide pin 42 can engage ends of the slots 30 to provide limits to the movement of the lower pedal arm 18 relative to the first and second members 14, 16 or the drive assembly 22 can provide electronic stops.

The guide slots 30 are preferably sized and shaped such that, as the guide pin 42 travels along the guide slots 30, the pedal 20 moves along a substantially linear horizontal path. The illustrated guide slots 30 are angled downward in a rearward direction, that is the forward end is located higher than the rearward end, to pivot the lower pedal arm 18 as the guide pin 42 travels along the guide slots 30. The orientation of the pedal 20 somewhat changes as it moves along its substantially linear horizontal path. It should be appreciated that by utilizing inclined or angled guide slots 30, the package size of the adjustable pedal assembly 10 can be optimized for a particular motor vehicle. Particularly, the length of the first and second members 14, 16 in the forward/rearward direction can be significantly reduced. This is particularly advantageous in compact or midsize motor vehicles having power steering because the available space for the adjustable pedal assembly 10 below the steering column is limited. It is noted, however, that the guide slots 30 can have other configurations such as, for example, horizontal and straight so that the lower pedal arm 18 travels in a horizontal path and does not pivot, but there is an increase in the package size of the adjustable pedal assembly 10. It is also noted that in configurations where the lower pedal arm 18 pivots, it may be required in some configurations to have pivotable movement in the drive assembly 22 between the lower pedal arm 18 and the upper pedal arm 12 such as, for example, the guide pin 42 pivotable relative to the lower pedal arm 18, the drive nut 64 pivotable relative to the guide pin 42, and/or the drive screw 60 pivotable relative to the drive screw housing 62 or upper pedal arm 12.

The drive assembly 22 includes a screw shaft or drive screw 60, a drive screw attachment or housing 62 for securing the drive assembly 22 to the upper pedal arm 12, the drive nut 64 adapted for movement along the drive screw 60 in response to rotation of the drive screw 60, an electric motor 66 for rotating the drive screw 60, and a drive cable 68 for operatively connecting the motor 66 to the drive screw 60 and transmitting rotational motion and torque thereto.

The drive screw 60 is an elongate shaft having a threaded portion adapted for cooperation with the drive nut 64. The drive screw 60 is preferably formed of metal such as, for example, steel but can be alternately formed of a plastic resin such as, for example, NYLON. The forward end of the drive screw 60 is journaled by the drive screw housing 62 for rotation of the drive screw 60 by the motor 66. The drive screw 60 rearwardly extends from the drive screw housing 62 generally parallel to and adjacent the slot 30 in the second member 16 in a cantilevered fashion. Mounted in this manner, the drive screw 60 is generally angled downward in a rearward direction. The illustrated drive screw 60 is provided with a bushing for connection to the housing 62 to form a relatively fixed rotating joint. The drive screw 60 can alternatively be connected to the drive screw housing 62 with a self-aligning or freely pivoting rotating joint, that is, a joint which freely permits pivoting of the drive screw 60 relative to the drive screw housing 62 and the first and second members 14, 16 about at least axes perpendicular to the drive screw rotational axis. The self-aligning joint automatically corrects misalignment of the drive screw 60 and/or the drive nut 64. The self-aligning joint also allows the slots 30 to be nonlinear when desired. The self aligning joint can be, for example, a ball/socket type joint.

The drive screw housing 62 is sized and shaped for supporting the forward end of the drive screw 60 and attaching the drive screw 60 to the first and second members 14, 16. The drive screw housing 62 is preferably molded of a suitable plastic material such as, for example, NYLON but can alternatively be formed of metal such as steel. The illustrated drive-screw housing 62 is secured to the upper pedal arm 12 with a snap-fit connection. It is noted, however, that the drive screw housing 62 can be secured to the upper pedal arm 12 in other suitable manners such as, for example, welding, staking, or mechanical fasteners. The illustrated housing 62 extends through an opening in only one of the first and second members 14, 16 (the second member 16) but alternatively can extend through openings in each of the first and second members 14, 16 to additionally connect the first and second members 14, 16 together.

The drive nut 64 is adapted for axial movement along the drive screw 60 in response to rotation of the drive screw 60. The drive nut 64 is preferably molded of a suitable plastic material such as, for example, NYLON but can alternatively be formed of metal such as, for example steel. The drive nut 64 is rigidly secured to the guide pin 42 as described hereinabove. The guide pin 42 can be alternatively connected to the drive nut 64 with a self-aligning or freely pivoting joint, that is, a joint which freely permits pivoting of the drive nut 64 relative to the guide pin 42 about at least axes perpendicular to the rotational axis of the drive screw 60. The self-aligning joint automatically corrects misalignment of the drive nut 64 and/or drive screw 60. The self aligning joint can be, for example, a ball/socket type joint.

The electric motor 66 can be of any suitable type and can be secured to the firewall or other suitable location such as, for example, the mounting bracket 24. The drive cable 68 is preferably a flexible push-pull-type cable and connects the motor 66 and the forward end of the drive screw 60 so that rotation of the motor 66 rotates the drive screw 60. It is noted that the drive screw 60 and the motor 66 can be alternatively connected with a rigid connection. An input end of the drive cable 68 is connected to an output shaft of the motor 66 and an output end of the drive cable 68 is connected to an end of the drive screw 60. It is noted that suitable gearing is provided between the motor 66 and the drive screw 60 as necessary depending on the requirements of the adjustable pedal assembly 10. It is also noted that the fixed or sheath portion of the drive cable 68 is rigidly secured to the forward end of the drive screw housing 62 and a rotating or core portion of the cable 68 is operatively connected to the forward end of the drive screw 60 to rotate the drive screw 60 therewith about its longitudinal axis. See U.S. Pat. No. 6,247,381, the disclosure of which is expressly incorporated herein in its entirety by reference, for a more detailed description of a suitable drive screw, housing, and/or cable support.

Preferably, a controller including processing means and memory means are adapted to control operation of the motor 66. The controller can be a dedicated controller, the motor vehicle control unit, or a controller of another system of the motor vehicle such as, for example, a keyless entry system or a powered seat system. See U.S. Pat. No. 6,352,007 and U.S. patent application Ser. No. 09/748,666 (titled "Adjustable Pedal Controller With Obstruction Detection" and filed on Dec. 22, 2000), the disclosures of which are expressly incorporated herein in their entirety by reference, for a more detailed description of a suitable control system having a controller.

To adjust the adjustable pedal assembly 10, the driver engages a control switch which activates rotation of the motor 66 in the desired direction. Rotation of the motor 66 rotates the drive screw 60 through the drive cable 68 and causes the drive nut 64 to axially move along the drive screw 60 in the desired direction. The drive nut 64 moves along the drive screw 60 because the drive nut 64 is held against rotation with the drive screw 60 by the guide pin 42. As the drive nut 64 axially moves along the drive screw 60, the guide pin 42 moves along the slots 30 because the guide pin 42 is secured to the drive nut 64. It is noted that binding of the drive nut 64 along the drive screw 60 is minimized if a self-aligning joint is provided, between the drive screw 60 and the drive screw housing 62 and/or the drive nut 64 and the guide pin 42, to automatically align the components so that the drive nut 64 can smoothly travel along the drive screw 60. As the guide pin 42 slidingly moves along the slots 30, the lower pedal arm 18 is moved therewith to adjust the forward/rearward position of the pedal 20 relative to the fixed mounting bracket 24. As the lower pedal arm moves 18, the first and second cam pins 54, 56 move along the first and second camming surfaces 38, 40. With this movement of the lower pedal arm 18, the pedal 20 travels in a substantially linear and horizontal path, that is, the pedal 20 moves in a forward/rearward direction and generally remains at the same height relative to the fixed mounting bracket 24 and the upper pedal arm 12 which does not move relative to the mounting bracket 24 during adjustment of the pedal 20. The lower pedal arm 18 pivots as it moves so that the orientation of the pedal 20 slightly changes. This change in orientation of the pedal 20 is typically too small to be detected by the motor vehicle operator. As the position of the pedal 20 is adjusted by rotating the drive screw 60, the upper pedal arm 12 remains in fixed position relative to the mounting bracket 24. It can be seen from the above description that activation of the motor 66 changes the position of the lower pedal arm 18 relative to the upper pedal arm 12 and the position of the pedal relative to the motor vehicle operator but not the position of the upper pedal arm 12 relative to the mounting bracket 24 and therefore does not affect the connection of the upper pedal arm 12 to the control device of the motor vehicle through the booster pin 32.

Figure 5:
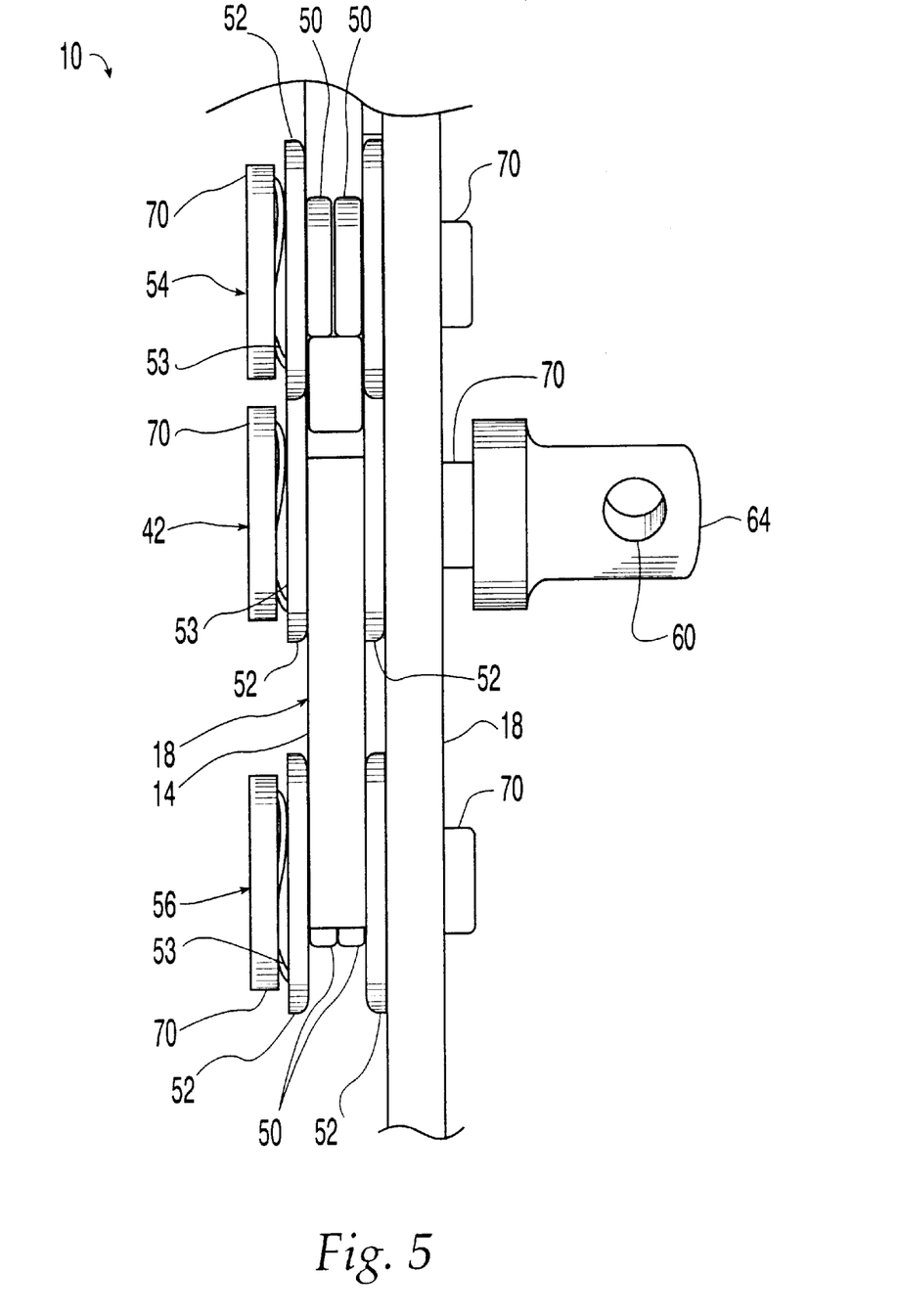
FIG. 5 is a rear elevational view similar to FIG. 3 but showing an alternative variation the adjustable pedal assembly of FIGS. 1 to 4.

FIG. 5 illustrates a variation of the adjustable pedal assembly 10 wherein like reference numbers number are utilized to illustrate like structure. This variation is substantially similar to the embodiment described in detail hereinabove except that a single one of the first and second members 14, 16 is utilized. Accordingly, the guide pin 42 and the first and second cam pins 54, 56 have a central portion which extends through both the upper pedal arm 12 and the lower pedal arm 18 and enlarged end portions 70 which retain the upper and lower pedal arms therebetween. The bushings 50 extend into the upper pedal arm 12 with the flanges 52 between the upper and lower pedal arms 12, 18 and between the upper pedal arm 12 and one of the end portions 70. This variation illustrates that the upper pedal arm 18, the guide pin 42, and the cam pins 54, 56 can each have a variety of different forms within the scope of the present invention.

Figure 6:
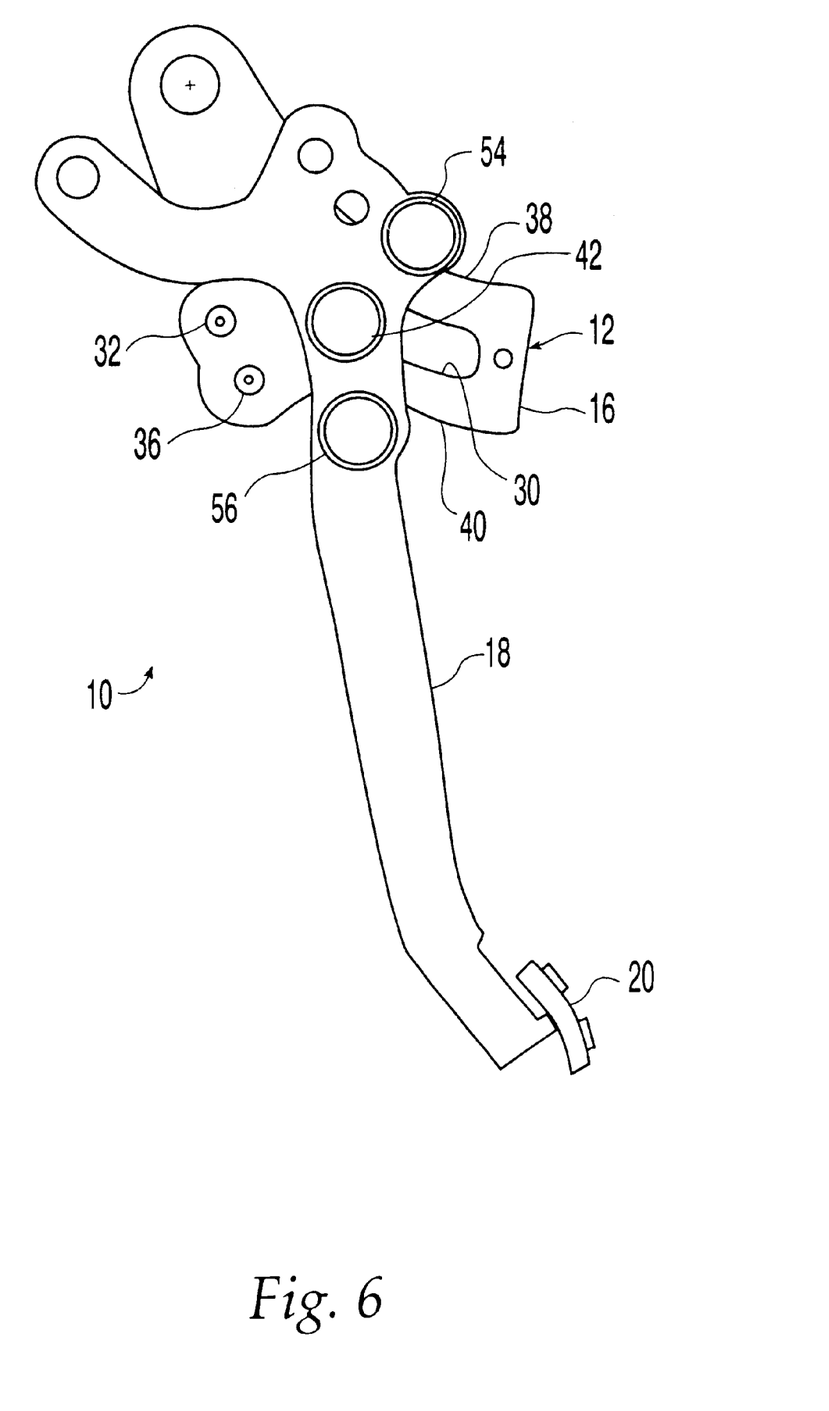
FIG. 6 is a left side elevational view similar to FIG. 1 but showing another alternative variation of the adjustable pedal assembly of FIGS. 1 to 4.

FIG. 6 illustrates another variation of the adjustable pedal assembly 10 wherein like reference numbers number are utilized to illustrate like structure. This variation is substantially similar to the embodiments described in detail hereinabove except that the spring member 58 is not utilized. This variation illustrates that the spring element is not required within the scope of the present invention.

Figure 7:
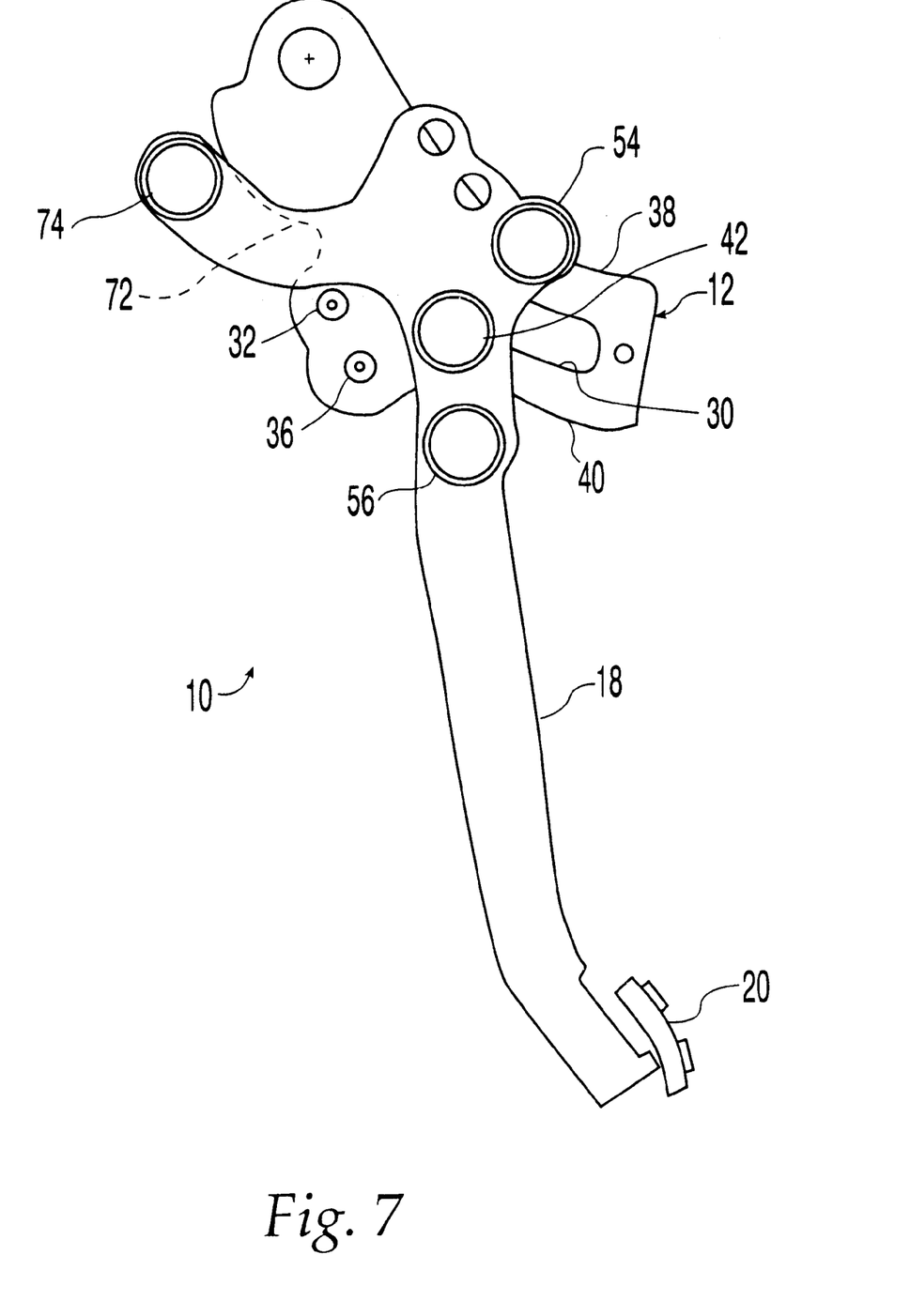
FIG. 7 is a left side elevational view similar to FIGS. 1 and 6 but showing yet another alternative variation of the adjustable pedal assembly of FIGS. 1 to 4.

FIG. 7 illustrates yet another variation of the adjustable pedal assembly 10 wherein like reference numbers number are utilized to illustrate like structure. This variation is substantially similar to the embodiments described in detail hereinabove except the upper pedal arm forms a third camming surface 72 and the lower pedal arm carries a third lock or cam follower or pin 74. The illustrated third camming surface 72 is formed by a forward peripheral edge of the upper pedal arm upper portion. This variation illustrates that there can be additional camming surfaces and/or cam pins within the scope of the present invention.

Figure 8:
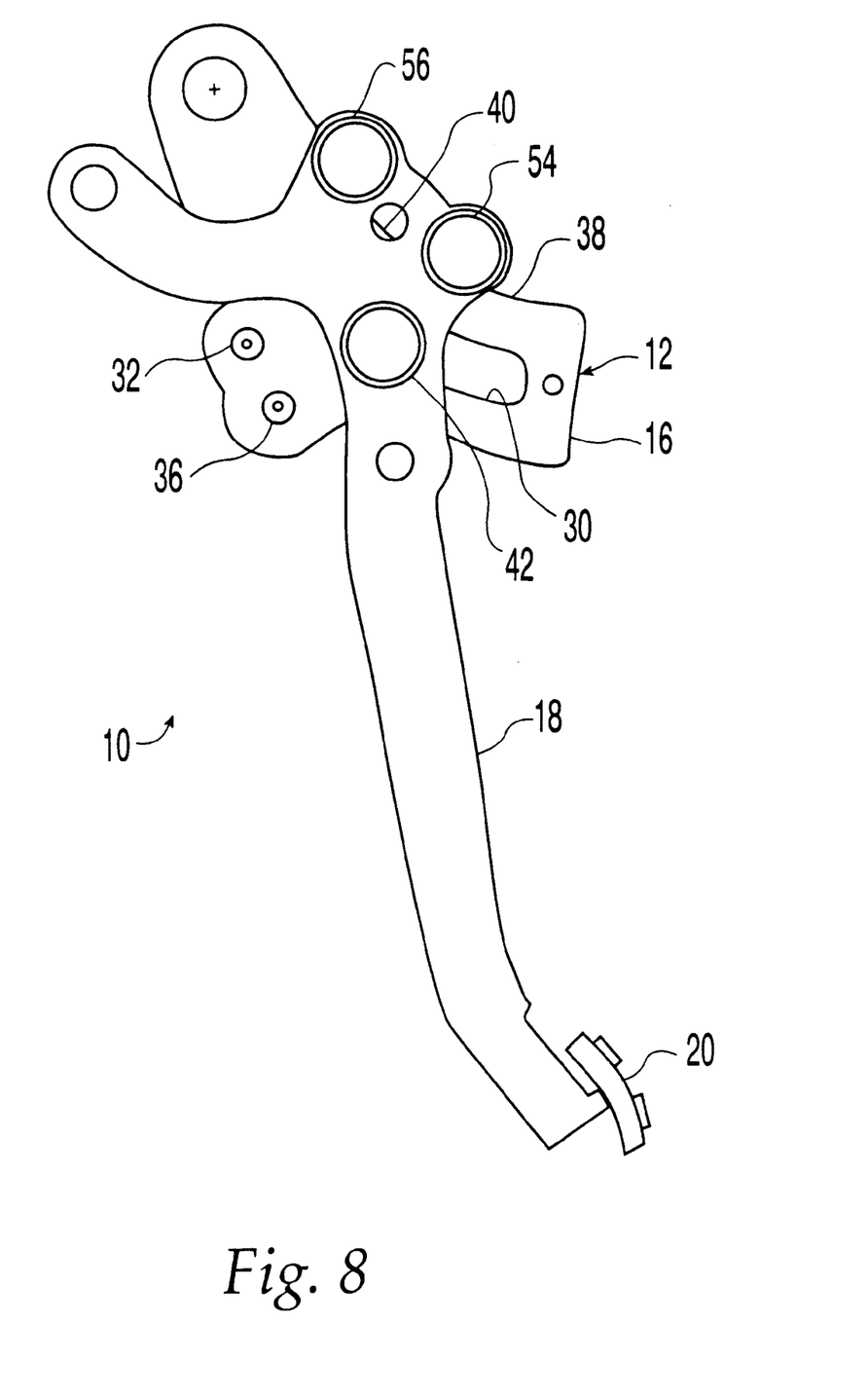
FIG. 8 is a left side elevational view similar to FIGS. 1, 6, and 7 but a second embodiment of the adjustable pedal assembly according to the present invention.

FIG. 8 illustrates a second embodiment of the adjustable pedal assembly 10 wherein like reference numbers number are utilized to illustrate like structure. This embodiment is substantially similar to the embodiments described in detail hereinabove except that the second camming surface 40 and the second cam pin 56 are located in different positions and the second camming surface 40 has a different shape. The illustrated second camming surface 40 is formed by a rear peripheral edge of the upper portion of the upper pedal arm member 16. This embodiment illustrates that the camming surfaces and cam pins can have other locations within the scope of the present invention.

Figure 9:
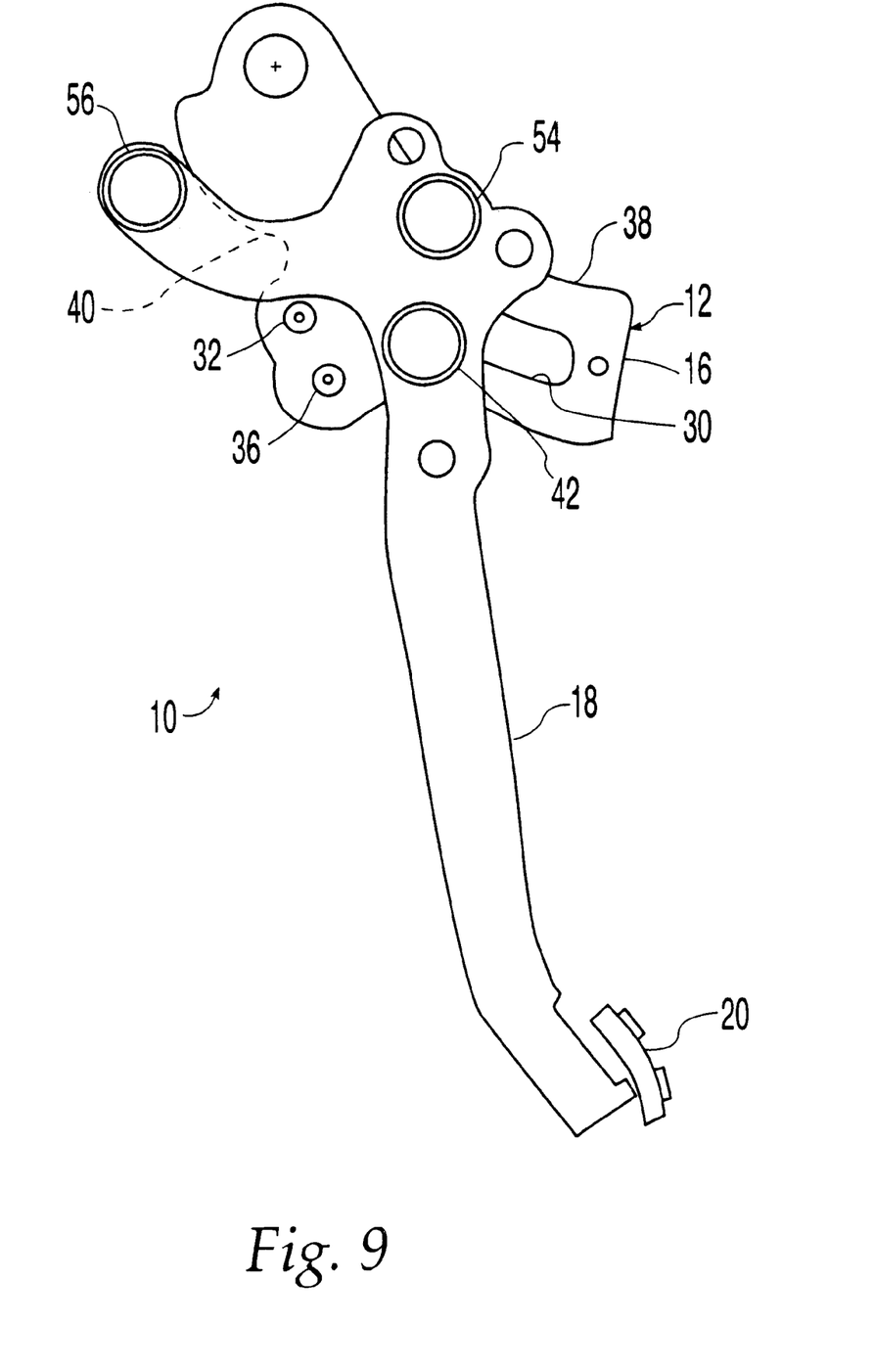
FIG. 9 is a left side elevational view similar to FIGS. 1, 6, 7, and 8 but a second embodiment of the adjustable pedal assembly according to the present invention.

FIG. 9 illustrates a third embodiment of the adjustable pedal assembly 10 wherein like reference numbers number are utilized to illustrate like structure. This embodiment is substantially similar to the embodiments described in detail hereinabove except that the second camming surface 40 and the second cam pin 56 are located in different positions and the second camming surface 40 has a different shape. The illustrated second camming surface 40 is formed by a forward peripheral edge of the upper portion of the upper pedal arm member 16. This embodiment further illustrates that the camming surfaces and cam pins can have many locations within the scope of the present invention.

It is noted that each of the features of the variations and embodiments disclosed herein can be utilized in combination with each of the other variations and embodiments. For example, the second and third embodiments can have first and second members 14, 15 and/or a third cam pin 74.

From the foregoing disclosure and detailed description of certain preferred embodiments, it is apparent that the lower pedal arm 18 is mechanically locked to the upper pedal arm 12 for rotation in unison about the pivot axis 28 when a load is applied to the pedal 20. Accordingly, the position of the lower pedal arm 18 relative to the upper pedal arm 12 is adjustable yet the upper and lower pedal arms 12, 18 are locked together for rotation and remain operational in their current position in the event of a failure of the drive assembly 22.

From the foregoing disclosure and detailed description of certain preferred embodiments, it is also apparent that various modifications, additions and other alternative embodiments are possible without departing from the true scope and spirit of the present invention. For example, it is apparent to those skilled in the art, given the benefit of the present disclosure, that the camming surfaces and cam pins can have many different forms. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An adjustable pedal assembly comprising, in combination:

an upper arm having a pivot fixed to a mounting bracket having a pivot axis;

a lower arm having a lower end carrying a pedal and an upper end operatively connected to the upper arm for selected movement relative to the upper arm;

a drive assembly operatively connected to the lower arm to selectively move the lower arm relative to the upper arm;

wherein the drive assembly includes a drive screw, a drive nut which moves along the drive screw upon rotation of the screw, and a motor for selectively rotating the drive screw;

one of the upper arm and the lower arm having first and second camming surfaces and the other of the upper arm and the lower arm carrying first and second cam followers engaging the first and second camming surfaces respectively; and wherein the first and second camming surfaces and the first and second cam followers lock the upper and lower arms together for mutual rotation about the pivot axis upon application of a load to the pedal when the lower arm is at any position relative to the upper arm and the drive screw and the drive nut do not connect the upper arm and the lower arm due to failure of the drive assembly.

2. The adjustable pedal assembly according to claim 1, further comprising a spring member biasing the first and second cam followers into engagement with the first and second camming surfaces.

3. The adjustable pedal assembly according to claim 1, wherein the first and second cam followers each include a laterally extending pin.

4. The adjustable pedal assembly according to claim 3, wherein the first and second cam followers each include a bushing encircling the pin.

5. The adjustable pedal assembly according to claim 4, wherein the bushing is a flanged bushing.

6. The adjustable pedal assembly according to claim 1, wherein the first and second cam followers are carried by the lower arm and the first and second camming surfaces are formed by the upper arm.

7. The adjustable pedal assembly according to claim 1, wherein the upper arm includes first and second generally planar members which are generally parallel and spaced apart and the lower arm extends between the first and second arms.

8. The adjustable pedal assembly according to claim 7, wherein the first and second members each have a slot formed therein and at least one guide pin carried by the lower arm extends into the slot of each of the first and second members.

9. The adjustable pedal assembly according to claim 7, wherein the first and second cam followers are carried by the lower arm and the first and second camming surfaces are each formed by the first and second members.

10. The adjustable pedal assembly according to claim 9, wherein the first and second cam surfaces are formed by peripheral edges of the first and second members.

11. The adjustable pedal assembly according to claim 1, wherein the upper arm is a generally planar member.

12. The adjustable pedal assembly according to claim 11, wherein the first and second camming surfaces are formed by peripheral edges of the member.

13. The adjustable pedal assembly according to claim 12, wherein the first camming surface is formed by a top edge of the member and the second camming surface is formed by a rearward edge of the member.

14. The adjustable pedal assembly according to claim 12, wherein the first camming surface is formed by a top edge of the member and the second camming surface is formed by a forward edge of the member.

15. The adjustable pedal assembly according to claim 12, wherein a third camming surface is formed by a forward edge of the member and a third cam follower is carried by the lower arm and engages the third camming surface.

16. The adjustable pedal assembly according to claim 1, wherein the first and second camming surfaces are formed by peripheral edges of the upper arm and form arcuate paths for the cam pins.

17. The adjustable pedal assembly according to claim 1, further comprising a mounting bracket and wherein the upper arm is pivotably connected to the mounting bracket by a pivot pin forming the pivot axis and the lower arm is spaced apart from the pivot pin.

18. An adjustable pedal assembly comprising, in combination:

an upper arm having a pivot fixed to a mounting bracket having a pivot axis and a generally planar member forming first and second camming surfaces at a peripheral edge thereof;

a lower arm having a lower end carrying a pedal and an upper end operatively connected to the upper arm for selected movement relative to the upper arm, the upper arm carrying first and second cam pins laterally extending from the lower arm and engaging the first and second camming surfaces respectively;

a drive assembly operatively connected to the lower arm to selectively move the lower arm relative to the upper arm;

wherein the drive assembly includes a drive screw, a drive nut which moves along the drive screw upon rotation of the screw, and a motor for selectively rotating the drive screw;

wherein the first and second camming surfaces are formed by peripheral edges of the member and form arcuate paths for the cam pins; and wherein the first and second camming surfaces and the first and second cam pins lock the upper and lower arms together for mutual rotation about the pivot axis upon application of a load to the pedal when the lower arm is at any position relative to the upper arm and the drive screw and the drive nut do not connect the upper arm and the lower arm due to failure of the drive assembly.

19. The adjustable pedal assembly according to claim 18, further comprising a mounting bracket and wherein the upper arm is pivotably connected to the mounting bracket by a pivot pin forming the pivot axis and the lower arm is spaced apart from the pivot pin.

20. An adjustable pedal assembly comprising, in combination:

a mounting bracket;

an upper arm having a pivot fixed to a mounting bracket having a pivot axis, the upper arm having first and second generally planar members, the first and second members being generally parallel and spaced apart, the first and second members each forming first and second camming surfaces at a peripheral edge thereof;

a lower arm having a lower end carrying a pedal and an upper end operatively connected to the upper arm for selected movement relative to the upper arm, the upper arm carrying first and second cam pins laterally extending from the lower arm and engaging the first and second camming surfaces,respectively;

wherein the lower arm is spaced apart from the pivot pin;

a drive assembly operatively connected to the lower arm to selectively move the lower arm relative to the upper arm;

wherein the drive assembly includes a drive screw, a drive nut which moves along the drive screw upon rotation of the screw, and a motor for selectively rotating the drive screw;

wherein the first and second camming surfaces are formed by peripheral edges of the member and form arcuate paths for the cam pins; and wherein the first and second camming surfaces and the first and second cam pins lock the upper and lower arms together for mutual rotation about the pivot axis upon application of a load to the pedal when the lower arm is at any position relative to the upper arm and the drive screw and the drive nut do not connect the upper arm and the lower arm due to failure of the drive assembly.

21. The adjustable pedal assembly according to claim 20, further comprising a spring member biasing the first and second cam pins into engagement with the first and second camming surfaces.

22. An adjustable pedal assembly comprising, in combination:

an upper arm having a pivot axis;

a lower arm having a lower end carrying a pedal and an upper end operatively connected to the upper arm for selected movement relative to the upper arm;

a drive assembly operatively connected to the lower arm to selectively move the lower arm relative to the upper arm;

one of the upper arm and the lower arm having first and second camming surfaces and the other of the upper arm and the lower arm carrying first and second cam followers engaging the first and second camming surfaces respectively, wherein the first and second camming surfaces and the first and second cam followers are adapted to lock the upper and lower arms together for mutual rotation about the pivot axis upon application of a load to the pedal;

wherein the upper arm is a generally planar member;

wherein the first and second camming surfaces are formed by peripheral edges of the member; and wherein the first camming surface is formed by a top edge of the member and the second camming surface is formed by a bottom edge of the member.

23. The adjustable pedal assembly according to claim 22, wherein a third camming surface is formed by a forward edge of the member and a third cam follower is carried by the lower arm and engages the third camming surface.

* * * * *